Nov. 17, 1931.  B. R. BENJAMIN  1,831,990
CULTIVATOR ATTACHMENT FOR TRACTORS
Filed June 21, 1930  2 Sheets-Sheet 2

Inventor
Bert R. Benjamin
By
Atty.

Patented Nov. 17, 1931

1,831,990

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

CULTIVATOR ATTACHMENT FOR TRACTORS

Application filed June 21, 1930. Serial No. 462,895.

This invention relates to a cultivator attachment for tractors.

The principal object of the invention is to provide improved means for attaching implements, such as cultivators, to the rear of a tractor.

Another object is to provide such a means particularly adaptable for attaching implements to a tractor of the so-called row crop or arched axle type of construction.

Another object is to provide means for simultaneously lifting and lowering a series of working implements attached at different lateral positions.

Other objects will be apparent from the detailed description to follow.

Figure 1:
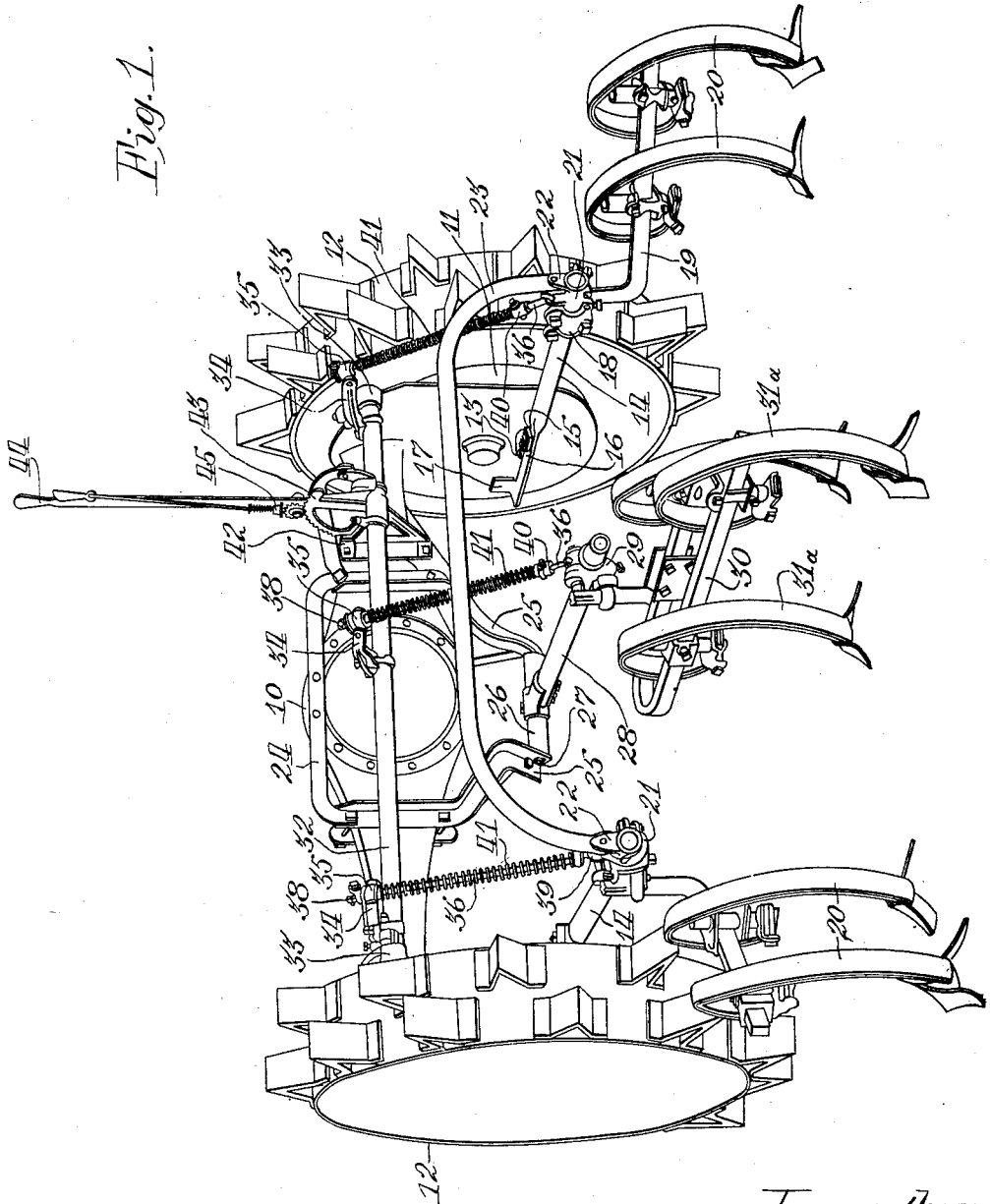
Figure 1 is a perspective view showing the rear portion of a tractor with an implement embodying the invention attached thereto.
Figure 2:
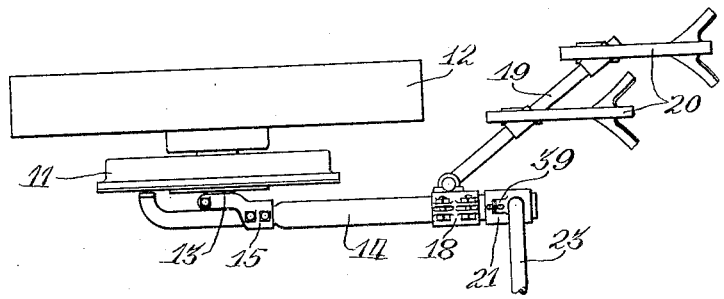
Figure 2 is a fragmentary plan view of one side of the structure shown in Figure 1 illustrating the means for attaching the side implement beams to the tractor; and, Figure 3 is an elevation of the elements shown in Figure 2.
Figure 3:
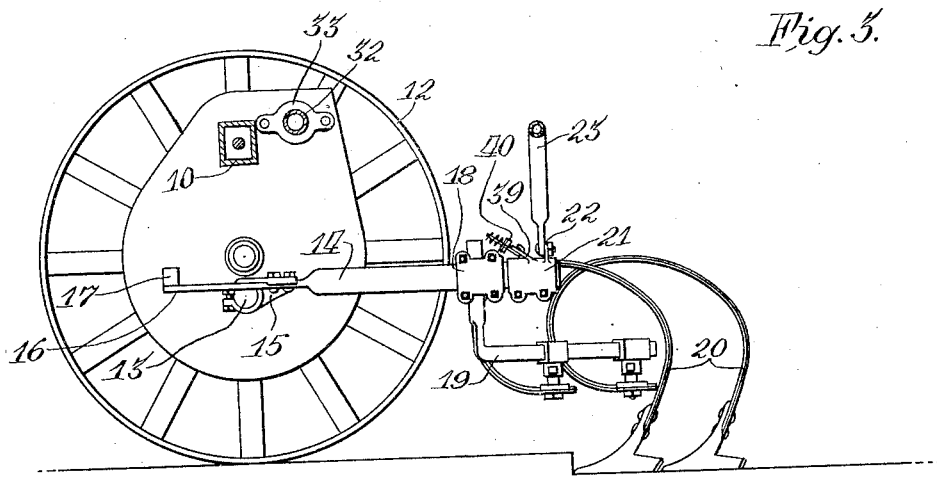

The portion of the tractor shown in the drawings is illustrative of a well known type of construction in which a rear axle housing 10 containing means for driving the tractor is provided with downwardly extending housings 11 attached at each end of the main housing. The housings 11 contain gearing for operating the drive wheels 12 which are mounted on stub-axles extending from the housings 11. This construction provides an arched axle which permits the use of the tractor for cultivating row crops. Short stub-shafts 13 are attached to the lower portion of the housings 11 and extend inwardly therefrom. The shafts 13 form means upon which the drawbar of the tractor is ordinarily attached. For embodying this invention, the drawbar is removed and implement carrying beams 14 are pivotally attached to the shafts 13 by brackets 15, which are rigidly secured to the beams 14 and clamped around the shafts 13.

A guide member 16 is also rigidly secured to each beam 14 and extends forwardly therefrom, being provided with an upturned flange 17 which abuts against the inside of the housing 11. Adjacent the rear end of each beam 14, a clamp 18 rigidly secures an angularly extending cultivator beam 19, to which a pair of spring shank cultivator shovels 20 are attached. The construction at each side is exactly the same, the beams 19 extending laterally in opposite directions in order to follow substantially behind the drive wheels 12 of the tractor. At the rear end of each of the beams 14, a clamp 21 is rigidly attached. Upstanding ears 22 on the clamps 21 provide means for pivotally attaching a cross-arch 23.

To support the center cultivator shovels, a frame structure 24 is secured to the housing 10. Said frame structure is rigidly secured to the housing and is provided with a pair of angular bars 25, which extend downwardly below the housing and have substantially vertical portions arranged in spaced relation. A sleeve 26 is mounted on a pin 27 extending through the two bars 25 to form means for mounting the center beam 28 on a horizontal, transversely extending axis. The beam 28 is provided with a clamp 29 which secures a beam 30 to which a series of spring shank cultivator shovels 31ª are attached.

A rockshaft 32 is mounted to the rear of the housing 10 in bearing brackets 33 secured to the inside portions of the housings 11. A series of lever arms 34 are mounted on the rockshaft in substantially vertical alignment with the beams 14 and the beam 28. At their rear ends, each of the lever arms 34 carries an apertured block 35 pivotally mounted at the ends of the arms on transverse axes. Rods 36 extend through the apertured blocks 35 and are provided with adjustable stops 38 above the blocks. The rods 36 extend rearwardly downward and are hooked into ears 39, which are provided on the upper side of the brackets 21 and the center bracket 29. Adjustable stops 40 are provided on the rods 36 for axial adjustment with respect thereto. Compression springs 41 are mounted on the rods 36 and abut the blocks 35 and the stops 40.

A bracket 42 attached at the rear side of the housing 10 extends rearwardly to the rockshaft and carries a quadrant 43 rigid with respect thereto. A hand lever 44, non-rotatively secured to the rockshaft 32, is provided with a latch mechanism 45 for selectively engaging different portions of the quadrant 43.

In the operation of this device, the adjustable stops 38 on the rods 36 are set to align the beams 14 and the center beam 28 in proper working position. The adjustable stops 40 on the rods 36 are positioned to give the desired spring pressure to hold the cultivator shovels 20 and 30 in working position. The cross arch 23 holds the beams 14 against lateral movement and provides for up and down movement of said beams, due to the pivoted attachment on the brackets 21. The guide members 16 provide additional means for holding the beams 14 in alignment. The center beam 28 is held in alignment by the T-connection with the sleeve 26.

The hand lever 44 mounted on the rockshaft provides means for adjusting the operating depth of the cultivating shovels and for lifting said shovels out of operative position.

It is to be understood that applicant has shown only a preferred embodiment of his device and that he claims as his invention all modifications falling within the scope of the appended claims.

What is claimed is:

1. In combination with a tractor having a rear axle housing and depending housings at each end thereof, a horizontal beam pivotally connected to the inside lower portion of each of the depending housings and extending rearwardly therefrom, soil working implements carried by said beams, a rockshaft mounted transversely along the axle housing, lever arms secured to said shaft in substantially vertical alignment with the implement beams, means for connecting the implement beams to the lever arms, means to rotate said rockshaft whereby the vertical position of the implements is varied, and means to lock the shaft in a plurality of positions.

2. In combination with a tractor having a rear axle housing and depending housings at each end thereof, a horizontal beam pivotally connected to the inside lower portion of each of the depending housings and extending rearwardly therefrom, rigid forward extensions on each of said beams adapted to abut the housing for preventing lateral displacement of the beams, soil working implements carried by said beams, a rockshaft mounted transversely along the axle housing, lever arms secured to said shaft in substantially vertical alignment with the implement beams, means for connecting the implement beams to the lever arms, means to rotate said rockshaft whereby the vertical position of the implements is varied, and means to lock the shaft in a plurality of positions.

3. In combination with a tractor having a rear axle housing and depending housings at the ends thereof, a horizontal beam pivotally connected to the inside lower portion of each of the depending housings and extending rearwardly therefrom, a cross-arch pivotally connected on longitudinal axes to the rear ends of said beams, soil working implements carried by said beams, a rockshaft mounted transversely along the axle housing, lever arms secured to said shaft in substantially vertical alignment with the implement beams, means for connecting the implement beams to the lever arms, means to rotate said rockshaft whereby the vertical position of the implements is varied, and means to lock the shaft in a plurality of positions.

4. The combination with a tractor having a rear axle housing and depending housings at the ends thereof, a horizontal beam pivotally connected to the inside lower portion of each of the depending housings and extending rearwardly therefrom, soil working implements carried by said beams, a rockshaft mounted transversely on the axle housing, lever arms secured to said shaft in substantially vertical alignment with the implement beams, an apertured block pivoted to each of said arms, rods extending through said blocks and being pivotally connected to the implement beams, adjustable stops on said rods above said blocks, adjustable stops on said rods below the blocks, compression springs abutting against said stops and against the lower sides of said blocks, means to rotate said rockshaft whereby the angular positions of the implement beams are varied, and means to lock the shaft in a plurality of positions.

5. In combination with a tractor having a rear axle housing and depending housings at the ends thereof, a horizontal beam pivotally connected to the inside lower portion of each of the depending housings and extending rearwardly therefrom, a beam supporting structure rigidly connected to the central portion of the axle housing, a beam pivotally connected to said support on a transverse axis and extending rearwardly therefrom, soil working implements carried by said beam and by the previously named horizontal beams, a rockshaft mounted transversely along the axle housing, lever arms secured to said shafts in substantially vertical alignment with the beams, means for connecting said arms to the beams, means to rotate said rockshaft whereby the vertical position of the beams is varied, and means to lock the shaft in a plurality of positions.

6. In combination with a tractor having a rear axle housing and depending housings at the ends thereof, a horizontal beam pivotally connected to the inside lower portion of each of the depending housings, and extending rearwardly therefrom, a cross-arch pivotally connected on a longitudinal axis to the rear ends of said beams, a beam supporting a structure rigidly connected to the central portion of the axle housing, a beam pivotally connected to said support on a transverse axis and extending rearwardly therefrom, soil working implements carried by said beam and by the previously named horizontal beams, a rockshaft mounted transversely along the axle housing, lever arms secured to said shafts in substantially vertical alignment with the beams, an apertured block pivoted to each of said arms, rods extending through said blocks and being pivotally connected to the beams, adjustable stops on said rods above said blocks, adjustable stops on said rods below the blocks, compression springs abutting against said stops and against the lower edge of said blocks, means to rotate said rockshaft whereby the vertical position of the beams is varied, and means to lock the shaft in a plurality of positions.

In testimony whereof I affix my signature.

BERT R. BENJAMIN.